(12) United States Patent  
Yue et al.

(10) Patent No.: US 12,614,796 B2  
(45) Date of Patent: Apr. 28, 2026

(54) HOUSING ASSEMBLY AND BATTERY

(71) Applicant: EVE POWER CO., LTD., Jingmen (CN)

(72) Inventors: Liangliang Yue, Jingmen (CN); Liming Huang, Jingmen (CN); Tianli Xiao, Jingmen (CN); Wen Chen, Jingmen (CN); Shangyi Li, Jingmen (CN); Jing Liu, Jingmen (CN); Yuebin Xu, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 653 days.

(21) Appl. No.: 18/088,829

(22) Filed: Dec. 27, 2022

(65) Prior Publication Data

US 2023/0378578 A1 Nov. 23, 2023

Related U.S. Application Data

(63) Continuation of application No. PCT/CN2022/125256, filed on Oct. 14, 2022.

(30) Foreign Application Priority Data

May 19, 2022 (CN) .......................... 202221264840.5

(51) Int. Cl.  
*H01M 50/202* (2021.01)  
*H01M 50/179* (2021.01)

(52) U.S. Cl.  
CPC ....... *H01M 50/202* (2021.01); *H01M 50/179* (2021.01)

(58) Field of Classification Search  
CPC ............. H01M 50/202; H01M 50/179; H01M 50/552; H01M 50/567; Y02E 60/10  
See application file for complete search history.

(56) References Cited

U.S. PATENT DOCUMENTS

2011/0097612 A1 4/2011 Lee et al.

FOREIGN PATENT DOCUMENTS

| CN | 103137343 | A |   | 6/2013 | |
|---|---|---|---|---|---|
| CN | 112303089 | A | * | 2/2021 | ................ F16B 5/04 |
| CN | 113097615 | A | * | 7/2021 | |
| CN | 113346168 | A |   | 9/2021 | |
| EP | 3972042 | A1 |   | 3/2022 | |

OTHER PUBLICATIONS

Extended European Search Report of European Patent Application No. 22818599.7 issued on Feb. 4, 2025.  
International Search Report of PCT Patent Application No. PCT/CN2022/125256 issued on Feb. 15, 2023.

\* cited by examiner

*Primary Examiner* — Daniel S Gatewood

(57) ABSTRACT

The present application provides a battery housing assembly and a battery. The housing assembly comprises a housing body, an electrode column and an insulating part, wherein the housing body is provided with a mounting hole, the electrode column penetrates the mounting hole, the column body comprises a first end and a second end, the second end is provided inside the housing body, the first end is provided with a restricting part, the second end is provided with a riveting part, the restricting part and the riveting part jointly clamp the insulating part and the housing body, the end surface of the second end is provided with a groove, and the groove is adjacent to the riveting part.

18 Claims, 3 Drawing Sheets

HOUSING ASSEMBLY AND BATTERY

CROSS REFERENCE TO RELATED APPLICATIONS

The present application is a Continuation Application of PCT Application No. PCT/CN2022/125256 filed on Oct. 14, 2022, which claims the benefit of Chinese Patent Application No. 202221264840.5, filed on May 19, 2022, all contents of which are incorporated herein by reference.

FIELD OF THE INVENTION

The present application relates to the field of battery technology, for example, a housing assembly, and a battery comprising this housing assembly.

BACKGROUND OF THE INVENTION

There are two main electrode lead-out methods on the market, wherein one is to lead out the positive electrode and negative electrode on the same side, and the other is to lead out the positive electrode and negative electrode on different sides. These two electrode lead-out methods are usually done by opening terminal lead-out holes on side(s) of the housing to lead out positive or negative terminals. In a particular battery structure, it is necessary to make the positive terminal and the steel housing having strong insulation and sealing to ensure the reliability of the electrical connection inside the battery. Therefore, there is an urgent need for a battery with a simple structure that satisfies the reliability of insulation, sealing, and internal electrical connection in the steel housing structure.

SUMMARY OF INVENTION

The present application provides a housing assembly with a simple structure, low manufacturing difficulty, and excellent sealing performance.

The present application provides a battery with good quality and high safety performance.

As a first aspect, the present application embodiment provides a housing assembly comprising a housing body, an electrode column and an insulating part, wherein the housing body is provided with a mounting hole, the electrode column penetrates the mounting hole, the insulating part is provided between the housing body and the electrode column, the electrode column comprises a column body, the column body penetrates the mounting hole, the column body comprises a first end and a second end, the second end is provided inside the housing body, the first end is provided with a restricting part, the second end is provided with a riveting part, the restricting part and the riveting part are provided to jointly clamp the insulating part and the housing body, an end surface of the second end is provided with a groove, and the groove is adjacent to the riveting part.

In one embodiment, the riveting part comprises a plurality of riveting sheets, the plurality of riveting sheets are provided in an annular pattern around the perimeter of the column body, a gap is provided between two adjacent riveting sheets.

In one embodiment, a distance between the two adjacent riveting sheets range from 1 mm to 20 mm.

In one embodiment, the groove is provided corresponding to each riveting sheet, wherein the groove is arc-shaped and the arc length of the groove is longer than the width of the riveting sheet.

In one embodiment, a ring of grooves is annularly provided around the center of the column body.

In one embodiment, a distance between the end surface of the second end and the end surface of the first end is L1, and a distance between the riveting part and the end surface of the first end is L2, with L1>L2.

In one embodiment, an outer edge of the riveting part is arc-shaped, a diameter of the outer edge of the riveting part is D1, a diameter of the column body is D2, and a ratio of D1 to D2 ranges from 1.5 to 10.

In one embodiment, the restricting part is provided with a protrusion on a side of the housing body, and the protrusion is provided against the insulating part.

In one embodiment, a plurality of the protrusions are provided around the perimeter of the column body; or, the protrusion is annular in shape and provided around the column body.

In an embodiment, the insulating part comprises a first insulating part and a second insulating part, wherein the first insulating part comprises a first hollow column and a first insulating sheet, the first hollow column is inserted into the mounting hole to separate the column body and the mounting hole, the first insulating sheet is provided between the restricting part and the housing body, and the second insulating part comprises a second hollow column and a second insulating sheet, the second hollow column is inserted into the mounting hole and connected to the first hollow column to separate the column body and the mounting hole, and the second insulating sheet is provided between the riveting part and the housing body.

In one embodiment, a side of the first hollow column and a side of the second hollow column at least partially overlap.

In one embodiment, the housing assembly further comprises a press ring, wherein the column body penetrates the press ring, the press ring is provided between the insulating part and the riveting part.

As a second aspect, the present application embodiment provides a battery comprising the housing assembly described above and an battery cell, wherein the battery cell is provided inside the housing body, two electrodes of the battery cell are respectively electrically connected to the housing body and the electrode column.

The advantageous effect of the present application is that: by providing an integrated electrode column and fixing the electrode column and the housing body by means of riveting, not only the structure of the electrode column may be simplified, but also the gap between the housing assembly due to assembly may be reduced and the sealing of the housing assembly may be improved; the insulating part may be provided not only to achieve the insulation between the electrode column and the housing body, but also to block the gap between the electrode column and the housing body and achieve the sealing of the housing assembly. By providing a groove at the second end of the electrode column, the local thickness between the riveting part and the column body may be reduced so that the riveting part may be bent according to the preset position, and the width of the riveting part may be flexibly adjusted by the radial position of the groove, which may facilitate the control of the deformation of the electrode column during the riveting process, which may as well as avoid the cracking problem due to the excessive width of the riveting part, thereby reducing the difficulty of riveting.

1: housing body; 101: mounting hole; 2: electrode column; 201: column body; 202: restricting part; 203: riveting part; 204: groove; 205: riveting sheet; 206: protrusion; 3: insulating part; 301: first insulating part; 3011: first hollow column; 3012: first insulating sheet; 302: second insulating part; 3021: second hollow column; 3022: second insulating sheet; 4: press ring.

DETAILED DESCRIPTION OF THE PREFERRED EMBODIMENTS

In the description of this application, the terms "connect", "join" and "fix" shall be understood in a broad sense unless otherwise explicitly specified and limited. For example, it can be a fixed connection, a detachable connection, or an integral body; it can be a mechanical connection or an electrical connection; it can be a direct connection or an indirect connection through an intermediate medium, and it can be a connection within two components or an interaction relationship between two components. To a person of ordinary skill in the art, the actual meaning of the above terms in the present application may be understood according to the actual situation.

Figure 1:
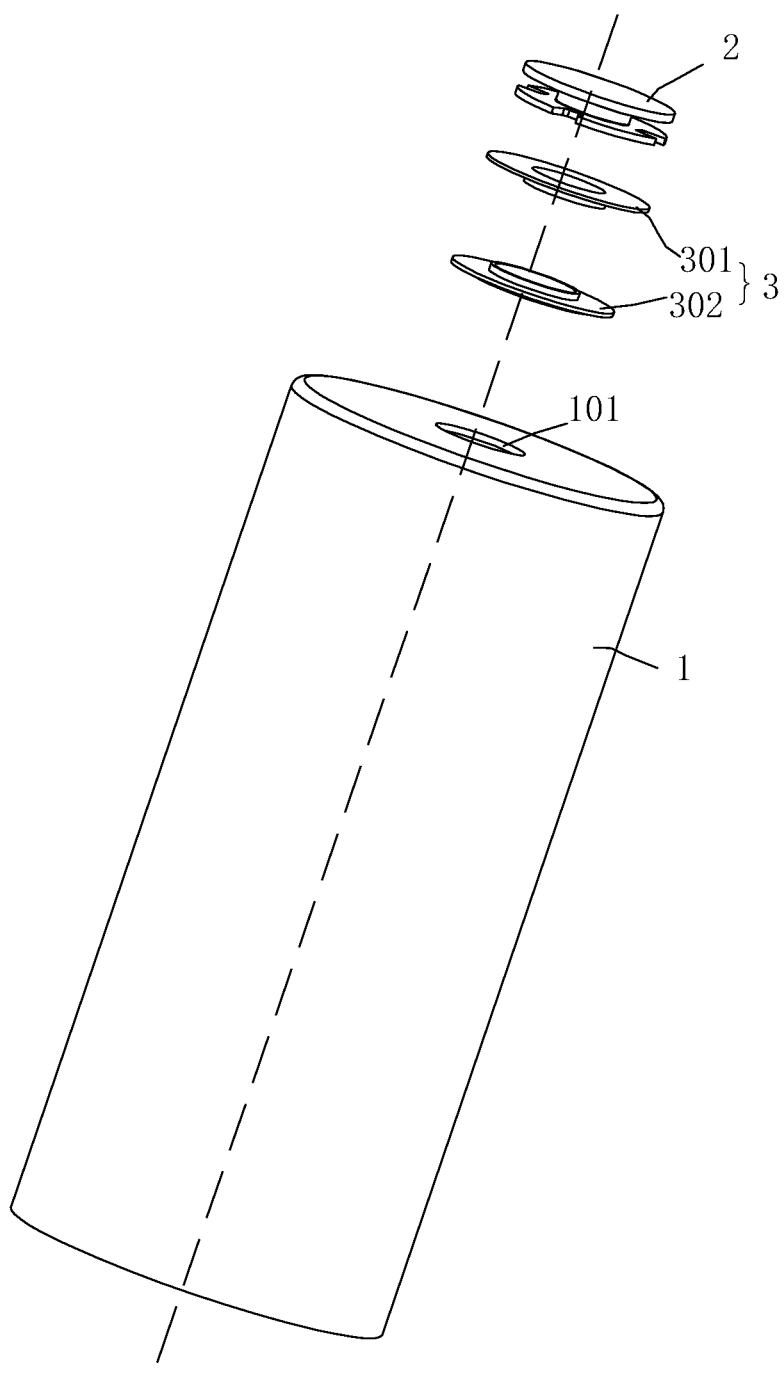
FIG. 1 is an exploded diagram of a housing assembly provided by an embodiment of the present application.
Figure 2:
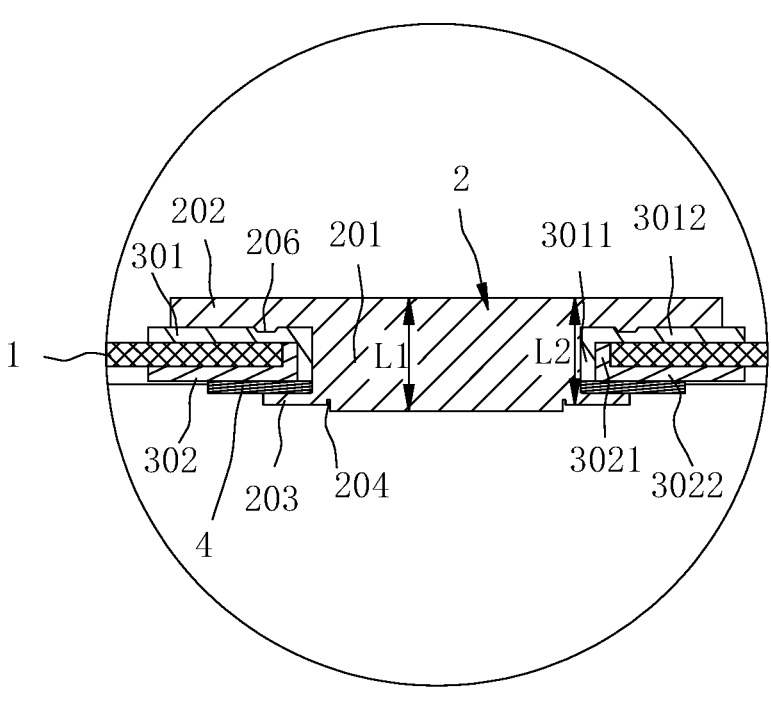
FIG. 2 is a partial cross-sectional view of a housing assembly provided in an embodiment of the present application.

As shown in FIG. 1 and FIG. 2, the present application provides a housing assembly comprising a housing body 1, an electrode column 2 and an insulating part 3, wherein a mounting hole 101 is provided in the housing body 1, the electrode column 2 penetrates the mounting hole 101, the insulating part 3 is provided between the housing body 1 and the electrode column 2, the electrode column 2 comprises a column body 201, the column body 201 penetrates the mounting hole 101, the column body 201 comprises a first end and a second end, the first end is provided on the outside of the housing body 1, the second end is provided on the inside of the housing body 1, the first end of the column body 201 is provided with a restricting part 202, the second end of the column body 201 is provided with a riveting part 203, the restricting part 202 and the riveting part 203 jointly clamp the insulating part 3 and the housing body 1, the end surface of the second end is provided with a groove 204, and the groove 204 is adjacent to the riveting part 203. By providing an integrated electrode column 2 and fixing the electrode column 2 and the housing body 1 by riveting, not only may the structure of the electrode column 2 be simplified, but also the gap between the housing assembly due to assembly may be reduced and the sealing of the housing assembly may be improved; the insulating part 3 may be provided not only to achieve insulation between the electrode column 2 and the housing body 1, but also to block the gap between the electrode column 2 and the housing body 1 and achieve the sealing of the housing assembly; by providing a groove 204 at the second end of the electrode column 2, the local thickness between the riveting part 203 and the column body 201 may be reduced so that the riveting part 203 may be bent according to the preset position, and the width of the riveting part 203 may be flexibly adjusted by the radial position of the groove 204, which may facilitate the control of the deformation of the electrode column 2 during the riveting process, which may as well as avoid the cracking problem due to the excessive width of the riveting part 203, thereby reducing the difficulty of riveting.

Figure 3:
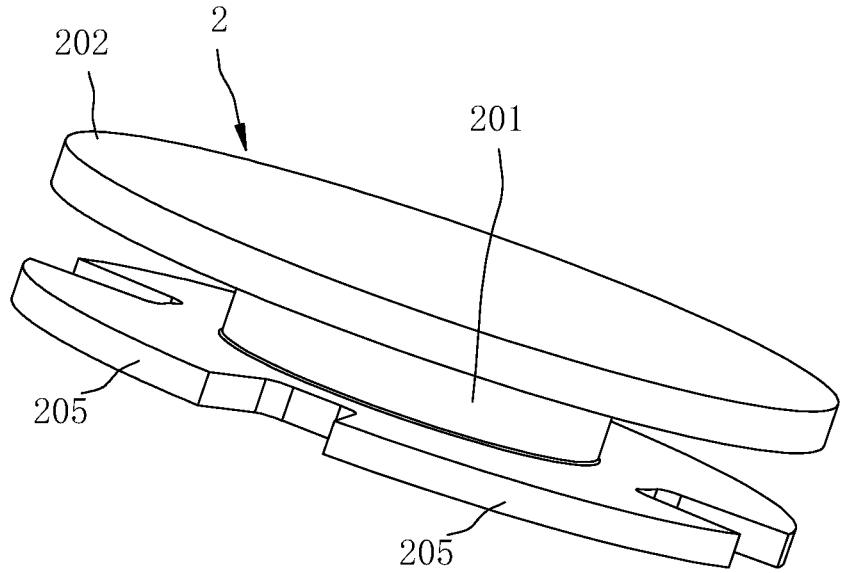
FIG. 3 is a diagram of an electrode column provided in an embodiment of the present application.
Figure 4:
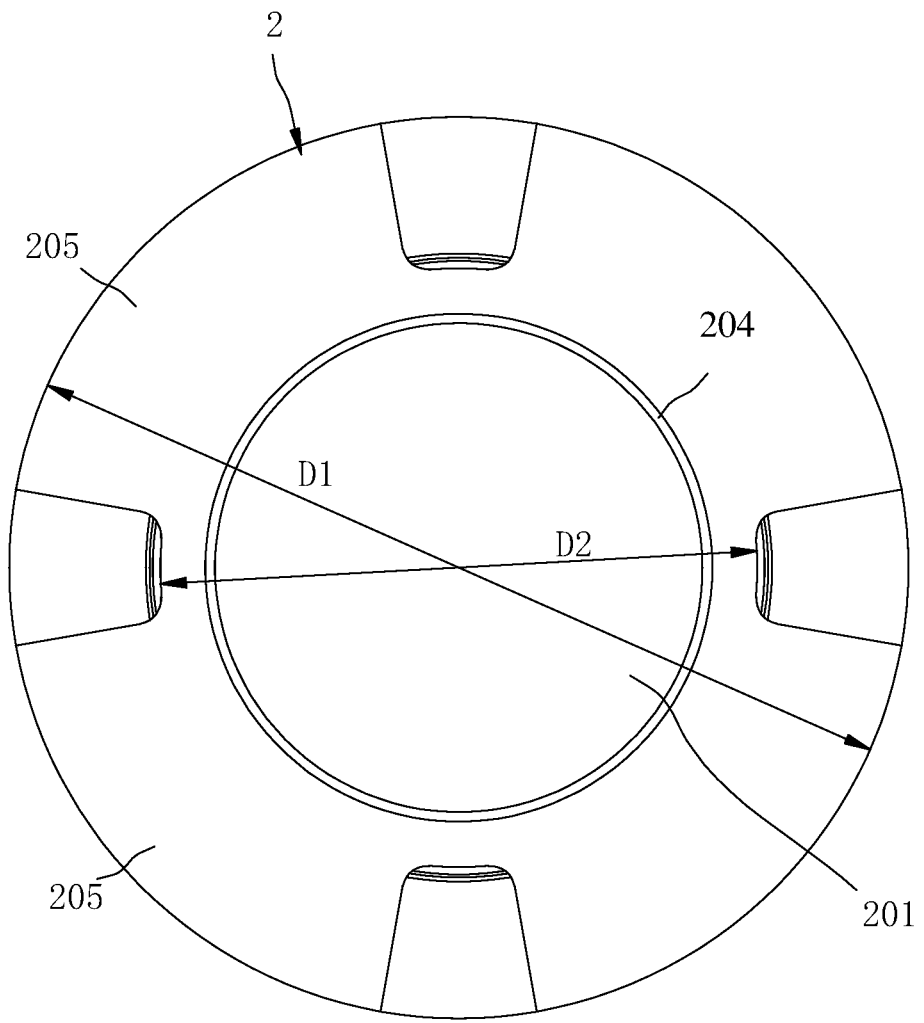
FIG. 4 is a bottom view of an electrode column provided in an embodiment of the present application.

Referring to FIG. 3 and FIG. 4, the riveting part 203 comprises a plurality of riveting sheets 205, and the plurality of riveting sheets 205 are provided in an annular pattern around the perimeter of the column body 201, and a gap is provided between two adjacent riveting sheets 205, and in this embodiment, after the riveting sheets 205 are riveted, the riveting sheets 205 are fan-shaped. By arranging multiple riveting sheets 205, it may reduce the possibility of cracking of the riveting sheets 205 during the riveting process. At this time, the length of the individual riveting sheets 205 can be appropriately increased, so that the electrode column 2 may be firmly fixed to the housing body 1, which may improve the deformation resistance of the electrode column 2, avoid the electrode column 2 from accidentally detaching from the housing body 1, and improve the safety performance of the housing assembly. In this embodiment, there are four riveting sheets 205. The four riveting sheets 205 are identical in size, and the four riveting sheets 205 are evenly provided around the perimeter of the column body 201, which may enable the electrode column 2 to be balanced in force and not easily deformed.

In the present embodiment, a distance between the two riveting pieces 205 ranges from 1 mm to 20 mm, and by limiting the distance between the two riveting pieces 205, the distance between the two riveting pieces 205 may be avoided to be too large or too small, so as to ensure the fixing effect between the electrode column 2 and the housing body 1.

Figure 5:
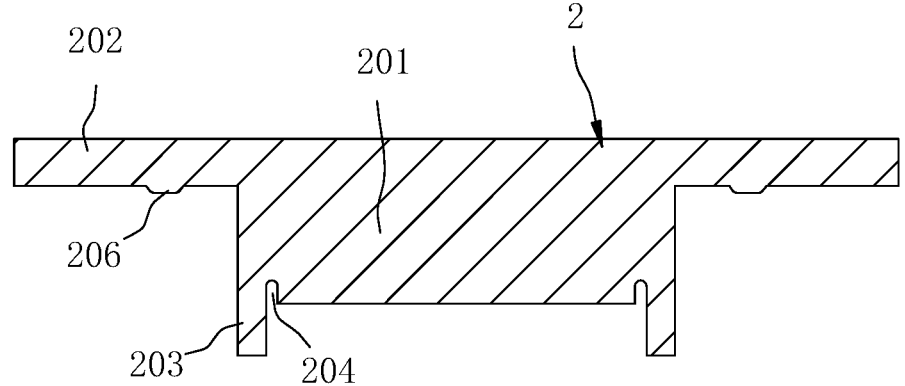
FIG. 5 is a diagram of an electrode column before riveting provided by an embodiment of the present application.

Referring to FIG. 5, each riveting sheet 205 is provided with a groove 204, wherein the groove 204 is in arc-shaped, and the arc length of the groove 204 is longer than the width of the riveting sheet 205. By providing the groove 204 with a length greater than the width of the riveting sheet 205, the riveting process can balance the forces on the riveting sheet 205 in as many places as possible, minimizing the problem of cracking between the riveting sheet 205 and the column body 201.

Referring to FIG. 4, in the present embodiment, the groove 204 is annular in shape, and a ring of grooves 204 is provided annularly around the center of the column body 201. At this time, all of the grooves 204 are adjacent to each other to form a ring-shaped structure, which reduces the difficulty of forming the grooves 204, thereby reducing the difficulty of processing the electrode column 2 and reducing the processing cost of the housing assembly. In the present embodiment, the groove 204 is circular in shape, and in other embodiments, the groove 204 may be in the shape of a rectangular ring.

Referring to FIG. 2, a distance between the end surface of the second end and the end surface of the first end is L1, and a distance between the riveting part 203 and the end surface of the first end is L2, with L1>L2. At this time, the end surface of the second end is protruding from the riveting part 203. In the present embodiment, the end surface of the second end of the column body 201 is provided to connect with the electrode sheet of the battery cell, and by providing the end surface of the second end of the column body 201 protruding from the riveting part 203, the connection between the column body 201 and the electrode sheet may be easily fixed, thereby ensuring the stability of the electrical connection between the electrode column 2 and the battery cell.

Referring to FIG. 4, an outer edge of the riveting part 203 is arc-shaped, a diameter of the outer edge of the riveting part 203 is D1, a diameter of the column body 201 is D2, and a ratio of D1 to D2 ranges from 1.5 to 10. In the present embodiment, the width of the riveting part 203 may be adjusted by adjusting the position of the groove 204, that is, by adjusting the ratio of D1 to D2, to avoid cracking of the riveting part 203 due to an excessively large width.

Referring to FIG. 2, a side of the restricting part 202 near the housing body 1 is provided with a protrusion 206, and the protrusion 206 is abut tightly against the insulating part 3. By providing the protrusion 206, a local distance between the restricting part 202 and the housing body 1 may be reduced. At this time, the amount of compression of the insulating part 3 corresponding to the position of the protrusion 206 is relatively large, so that the sealing effect between the electrode column 2 and the housing body 1 can be improved.

In one embodiment, a plurality of protrusions 206 are provided, and the plurality of protrusions 206 are provided around the perimeter of the column body 201; in another embodiment, the protrusions 206 are annular in shape, and the protrusions 206 are provided around the column body 201. The shape of the protrusions 206 affects the processing difficulty of the electrode column 2 so as to affect the manufacturing cost of the housing assembly. Providing a plurality of protrusions 206 with different shapes allows the type of protrusions 206 to be selected according to actual needs, so that the housing assembly can meet different sealing standards and achieve a win-win situation in terms of quality and cost.

Referring to FIG. 1 and FIG. 2, the insulating part 3 comprises a first insulating part 301 and a second insulating part 302, wherein the first insulating part 301 comprises a first hollow column 3011 and a first insulating sheet 3012, the first hollow column 3011 is inserted into the mounting hole 101 to separate the column body 201 and the mounting hole 101, and the first insulating sheet 3012 is provided between the restricting part 202 and the housing body 1. The second insulating part 302 comprises a second hollow column 3021 and a second insulating sheet 3022, the second hollow column 3021 is inserted into the mounting hole 101 and connected to the first hollow column 3011 to separate the column body 201 and the mounting hole 101, and the second insulating sheet 3022 is provided between the riveting part 203 and the housing body 1. By providing the separated insulating part 3, it may reduce the difficulty of assembling the housing assembly, so as to improve the assembly efficiency of the housing assembly.

In one embodiment, the side of the first hollow column 3011 and the side of the second hollow column 3021 at least partially overlap. By providing overlapping first hollow column 3011 and second hollow column 3021, it may avoid the separation of the first insulating part 301 and the second insulating part 302 under the radial force during riveting, so as to avoid the short circuit between the electrode column 2 and the housing body 1; the overlapping first hollow column 3011 and second hollow column 3021 may avoid the air insulation between the electrode column 2 and the steel housing, so as to avoid the creep-age phenomenon.

In the present embodiment, the material of the electrode column 2 may be aluminum or aluminum alloy. The material of the first insulating part 301 and the second insulating part 302 may be fusible Perfluoroalkoxy (PFA), polyethylene glycol terephthalate (PET), polypropylene (PP), fluoroelastomer or rubber and other insulating materials with certain elasticity. The material of the housing body 1 is steel.

Referring to FIG. 2, the housing assembly further comprises a press ring 4, which is provided on the inner side of the housing body 1, the column body 201 of the electrode column 2 penetrates the press ring 4, and the press ring 4 is provided between the second insulating part 302 and the riveting part 203. In the present embodiment, the press ring 4 is made of an insulating material. During the process of riveting, the press ring 4 can prevent the riveting part 203 of the electrode column 2 from contacting the housing body 1. Therefore, the arrangement of the press ring 4 can provide double protection. If the second insulating part 302 shifts, the press ring 4 can prevent the electrode column 2 from contacting the housing body 1 resulting in a short circuit of the battery. In the present embodiment, an inner diameter of the press ring 4 ranges from 5 mm-20 mm, an outer diameter of which ranges from 7 mm-30 mm, and a thickness of which ranges from 0.4 mm-1.2 mm.

The present embodiment further provides a battery comprising a battery cell and a housing assembly as described above, the battery cell is provided in the housing body 1, and the two electrodes of the battery cell are respectively electrically connected to the housing body 1 and the electrode column 2. Since the housing assembly provides better sealing and insulation, the battery made by this housing assembly provides higher safety performance, and since the housing assembly may better control the deformation of electrode column 2 during the riveting process and improve the riveting quality, the battery made by this housing assembly provides better quality.

In the present embodiment, the housing body 1 is connected to the negative electrode of the battery cell and the electrode column 2 is connected to the positive electrode of the battery cell, that is the housing body 1 is the negative electrode of the battery and the electrode column 2 is the positive electrode of the battery.

In the description of the present embodiment, the terms "up", "down", "left", "right" and other orientation or position relationships are based on the orientation or position relationships shown in the attached drawings. It is intended to facilitate description and simplify operation, not to indicate or imply that the referred device or element has a particular orientation, or is constructed and operated in a particular orientation. Therefore, they may not be construed as a limitation of the present invention. In addition, the terms "first" and "second" are used for descriptive distinction and have no special meaning.

In the description of this specification, reference to the description of the term "an embodiment", "example", etc. means that the features, structures, materials or characteristics described in connection with the embodiment or example are included in at least one embodiment or example of the present application. In this specification, the schematic representation of the above terms does not necessarily refer to the same embodiment or example.

In addition, although the present specification is described in accordance with embodiments, not every embodiment contains only an independent technical solution. The specification of such narrative is only for clarity, the skilled person in the field should take the specification as a whole, and the technical solutions in the multiple embodiments can also be appropriately combined to form other implementations that can be understood by those skilled in the art.

The invention claimed is:

1. A housing assembly, comprising
   a housing body, an electrode column and an insulating part, wherein the housing body is provided with a mounting hole, the electrode column penetrates the mounting hole, the insulating part is provided between the housing body and the electrode column, the electrode column comprises a column body, the column body penetrates the mounting hole, the column body comprises a first end and a second end, the second end is provided inside the housing body, the first end is provided with a restricting part, the second end is provided with a riveting part, the restricting part and the riveting part are provided to jointly clamp the insulating part and the housing body, an end surface of the second end is provided with a groove, and the groove is adjacent to the riveting part;

wherein the riveting part comprises a plurality of riveting sheets, the plurality of riveting sheets are provided in an annular pattern around a perimeter of the column body, a gap is provided between two adjacent riveting sheets; wherein a distance between two adjacent riveting sheets ranges from 1 mm to 20 mm.

2. The housing assembly according to claim 1, wherein the groove is provided corresponding to each riveting sheet, the groove is arc-shaped and an arc length of the groove is longer than a width of the riveting sheet.

3. The housing assembly according to claim 1, wherein a ring of grooves is annularly provided around a center of the column body.

4. The housing assembly according to claim 1, wherein a distance between the end surface of the second end and the end surface of the first end is L1, and a distance between the riveting part and the end surface of the first end is L2, with L1>L2.

5. The housing assembly according to claim 1, an outer edge of the riveting part is arc-shaped, a diameter of the outer edge of the riveting part is D1, a diameter of the column body is D2, and a ratio of D1 to D2 ranges from 1.5 to 10.

6. The housing assembly according to claim 1, wherein a side of the restricting part near the housing body is provided with a protrusion, the protrusion abuts tightly against the insulating part.

7. The housing assembly according to claim 6, wherein a plurality of protrusions are provided around a perimeter of the column body; or, the protrusion is annular in shape and provided around the column body.

8. The housing assembly according to claim 1, wherein the insulating part comprises a first insulating part and a second insulating part, the first insulating part comprises a first hollow column and a first insulating sheet, the first hollow column is inserted into the mounting hole to separate the column body and the mounting hole, the first insulating sheet is provided between the restricting part and the housing body, and the second insulating part comprises a second hollow column and a second insulating sheet, the second hollow column is inserted into the mounting hole and connected to the first hollow column to separate the column body and the mounting hole, and the second insulating sheet is provided between the riveting part and the housing body.

9. The housing assembly according to claim 8, wherein a side of the first hollow column and a side of the second hollow column at least partially overlap.

10. The housing assembly according to claim 1, further comprises a press ring, wherein the column body penetrates the press ring, the press ring is provided between the insulating part and the riveting part.

11. A battery comprising a housing assembly and a battery cell, wherein the battery cell is provided inside the housing body, two electrodes of the battery cell are respectively electrically connected to the housing body and the electrode column; wherein the housing assembly comprises:

a housing body, an electrode column and an insulating part, wherein the housing body is provided with a mounting hole, the electrode column penetrates the mounting hole, the insulating part is provided between the housing body and the electrode column, the electrode column comprises a column body, the column body penetrates the mounting hole, the column body comprises a first end and a second end, the second end is provided inside the housing body, the first end is provided with a restricting part, the second end is provided with a riveting part, the restricting part and the riveting part are provided to jointly clamp the insulating part and the housing body, an end surface of the second end is provided with a groove, and the groove is adjacent to the riveting part;

wherein the riveting part comprises a plurality of riveting sheets, the plurality of riveting sheets are provided in an annular pattern around a perimeter of the column body, a gap is provided between two adjacent riveting sheets; wherein a distance between two adjacent riveting sheets ranges from 1 mm to 20 mm.

12. A battery comprising a housing assembly as claimed in claim 2 and a battery cell, wherein the battery cell is provided inside the housing body, two electrodes of the battery cell are respectively electrically connected to the housing body and the electrode column.

13. A battery comprising a housing assembly according to claim 8 and a battery cell, wherein the battery cell is provided inside the housing body, two electrodes of the battery cell are respectively electrically connected to the housing body and the electrode column.

14. A battery comprising a housing assembly according to claim 10 and a battery cell, wherein the battery cell is provided inside the housing body, two electrodes of the battery cell are respectively electrically connected to the housing body and the electrode column.

15. A battery comprising a housing assembly according to claim 3 and a battery cell, wherein the battery cell is provided inside the housing body, two electrodes of the battery cell are respectively electrically connected to the housing body and the electrode column.

16. A battery comprising a housing assembly according to claim 4 and a battery cell, wherein the battery cell is provided inside the housing body, two electrodes of the battery cell are respectively electrically connected to the housing body and the electrode column.

17. A battery comprising a housing assembly according to claim 5 and a battery cell, wherein the battery cell is provided inside the housing body, two electrodes of the battery cell are respectively electrically connected to the housing body and the electrode column.

18. A battery comprising a housing assembly according to claim 6 and a battery cell, wherein the battery cell is provided inside the housing body, two electrodes of the battery cell are respectively electrically connected to the housing body and the electrode column.

* * * * *